United States Patent [19]

Le Van Suu

[11] Patent Number: 5,805,926
[45] Date of Patent: Sep. 8, 1998

[54] SYSTEM FOR CONTROLLER MAINTAINS TABLE SHOWING ACTUATORS AND SENSORS AND ACCORDINGLY ASSIGNING ADDRESSES AND ADDS TO TABLE IF ACTUATORS AND SENSORS WERE ADDED DURING SAME TIME

[75] Inventor: Maurice Gilbert Le Van Suu, Romainville, France

[73] Assignee: SGS-Thomson Microelectronics, S.A., Gentilly, France

[21] Appl. No.: 456,099

[22] Filed: May 30, 1995

[30] Foreign Application Priority Data

May 31, 1994 [FR] France .................................. 94 06635

[51] Int. Cl.⁶ .................................................. G06F 13/00
[52] U.S. Cl. ............................................ 395/836; 395/892
[58] Field of Search ........................... 318/625; 364/200, 364/900; 395/425, 829; 340/825.52; 358/142, 147, 84; 380/23

[56] References Cited

U.S. PATENT DOCUMENTS

| | | | |
|---|---|---|---|
| 4,792,731 | 12/1988 | Pearlman et al. | 315/316 |
| 5,059,871 | 10/1991 | Pearlman et al. | 315/316 |
| 5,144,666 | 9/1992 | Le Van Suu | 380/38 |
| 5,352,957 | 10/1994 | Werner | 315/291 |
| 5,382,951 | 1/1995 | White et al. | 340/825.52 |
| 5,400,330 | 3/1995 | Le Van Suu | 370/97 |
| 5,406,248 | 4/1995 | Le Van Suu | 340/310.01 |
| 5,410,292 | 4/1995 | Le Van Suu | 340/310.06 |
| 5,453,738 | 9/1995 | Zirkl et al. | 340/825.52 |

FOREIGN PATENT DOCUMENTS

| | | |
|---|---|---|
| 0361993 | of 0000 | European Pat. Off. |
| 0466152 | of 0000 | European Pat. Off. |
| 0562333 | of 0000 | European Pat. Off. |
| 0574636 | of 0000 | European Pat. Off. |
| 2670590 | of 0000 | France . |

Primary Examiner—Thomas C. Lee
Assistant Examiner—Anderson I. Chen
Attorney, Agent, or Firm—Allen, Dyer, Doppelt, Milbrath & Gilchrist, P.A.

[57] ABSTRACT

A method is provided for controlling a plurality of electrical installations (A1–A3, B1–B4) of one or more types connected to a common data path (52), each including means for decoding a signal transmitted over this common data path to it by a single controller (50), comprising the steps of: transmitting, from each controlled installation to the single controller (50), an identification data frame, containing an installation type identifier code ($b_8$–$b_{23}$); receiving of the identification data frame by the controller (50); decoding of the identification data frame by the controller (50); controlling of the installation (A1–A3, B1–B4) by the single controller according to a set of instructions (56, 57, 58) held in an instruction memory (55) of the single controller (50) and corresponding to the type of installation identified by the installation type identification code ($b_8$–$b_{23}$); and further comprising the steps of: organizing electrical installations of a same type into groups (A, B, C, D); transmitting a group identifier code ($b_{24}$–$b_{27}$) within a frame of data in either direction between each installation and the single controller (50); decoding (53, 54) of the received group identifier code by the single controller (50); controlling of the installation by the single controller (50) according to a subset of instructions (56, 57, 58) corresponding to the group (A, B, C, D) of installations within the type of installation, stored within the instruction memory (55) of the single controller (50).

18 Claims, 7 Drawing Sheets

| ADDRESS | CONTENT | |
|---|---|---|
| 0 0001 0010 0001 | 1 0001 | HEATERS OF GROUP A |
| 0 0001 0010 0010 | 1 1010 | |
| 0 0001 0010 0011 | 1 0011 | |
| 0 0001 0010 0100 | 0 0000 | |
| | | |
| 0 0001 0100 0001 | 1 0100 | HEATERS OF GROUP B |
| 0 0001 0100 0010 | 1 0110 | |
| 0 0001 0100 0011 | 1 0101 | |
| 0 0001 0100 0100 | 1 0111 | |
| 0 0001 0100 0101 | 0 0000 | |
| | | |
| 0 0001 1000 0001 | 1 0010 | HEATERS OF GROUP C |
| 0 0001 1000 0010 | 1 1000 | |
| 0 0001 1000 0011 | 1 1001 | |
| 0 0001 1000 0100 | 0 0000 | |
| | | |
| 1 0001 0010 0001 | 1 1100 | SENSORS OF GROUP A |
| 1 0001 0010 0010 | 0 0000 | |
| | | |
| 1 0001 0100 0001 | 0 1100 | SENSORS OF GROUP B |
| 1 0001 0100 0010 | 0 1101 | |
| 1 0001 0100 0011 | 0 0000 | |
| | | |
| 1 0001 1000 0001 | 0 1110 | SENSORS OF GROUP C |
| 1 0001 1000 0010 | 0 0000 | |

FIG. 3

| MANUFACTURER | INSTALLATION TYPE | GROUP | INSTAL-LATION ADDRESS | FRAME TYPE | INSTRUCTION |
|---|---|---|---|---|---|
| 10000000 | 0000000000000000 | 00000101 | 10001 | 10011 | HEAT |
| $b_0$　$b_7 b_8$ | | $b_{23} b_{24}$　$b_{27} b_{28}$ | $b_{32} b_{33}$ | $b_{36} b_{37}$ | $b_{255}$ |

FIG. 4A

| 10000000 | 0000000000000000 | 00000101 | 00001 | 11100 | HEAT A1 |
|---|---|---|---|---|---|
| $b_0$　$b_7 b_8$ | | $b_{23} b_{24}$　$b_{27} b_{28}$ | $b_{32} b_{33}$ | $b_{36} b_{37}$ | $b_{255}$ |

FIG. 4B

| 10000000 | 0000000000000000 | 00000100 | 11111 | 0110 | OFF |
|---|---|---|---|---|---|
| $b_0$　$b_7 b_8$ | | $b_{23} b_{24}$　$b_{27} b_{28}$ | $b_{32} b_{33}$ | $b_{36} b_{37}$ | $b_{255}$ |

FIG. 5A

| 10000000 | 0000000000000000 | 00000100 | 00001 | 11100 | B1 OFF |
|---|---|---|---|---|---|
| $b_0$　$b_7 b_8$ | | $b_{23} b_{24}$　$b_{27} b_{28}$ | $b_{32} b_{33}$ | $b_{36} b_{37}$ | $b_{255}$ |

FIG. 5B

| 10000000 | 0000000000000001 | 00100000 | 00001 | 1010 | T=22°C; $S_A$ |
|---|---|---|---|---|---|
| $b_0$　$b_7 b_8$ | | $b_{23} b_{24}$　$b_{27} b_{28}$ | $b_{32} b_{33}$ | $b_{36} b_{37}$ | $b_{255}$ |

| ADDRESS | CONTENT | |
|---|---|---|
| 0  0001 0010 0001 | 1 0 0 0 1 | HEATERS OF GROUP A |
| 0  0001 0010 0010 | 1 1 0 1 0 | |
| 0  0001 0010 0011 | 1 0 0 1 1 | |
| 0  0001 0010 0100 | 0 0 0 0 0 | |
| 0  0001 0100 0001 | 1 0 1 0 0 | HEATERS OF GROUP B |
| 0  0001 0100 0010 | 1 0 1 1 0 | |
| 0  0001 0100 0011 | 1 0 1 0 1 | |
| 0  0001 0100 0100 | 1 0 1 1 1 | |
| 0  0001 0100 0101 | 0 0 0 0 0 | |
| 0  0001 1000 0001 | 1 0 0 1 0 | HEATERS OF GROUP C |
| 0  0001 1000 0010 | 1 1 0 0 0 | |
| 0  0001 1000 0011 | 1 1 0 0 1 | |
| 0  0001 1000 0100 | 0 0 0 0 0 | |
| 1  0001 0010 0001 | 1 1 1 0 0 | SENSORS OF GROUP A |
| 1  0001 0010 0010 | 0 0 0 0 0 | |
| 1  0001 0100 0001 | 0 1 1 0 0 | SENSORS OF GROUP B |
| 1  0001 0100 0010 | 0 1 1 0 1 | |
| 1  0001 0100 0011 | 0 0 0 0 0 | |
| 1  0001 1000 0001 | 0 1 1 1 0 | SENSORS OF GROUP C |
| 1  0001 1000 0010 | 0 0 0 0 0 | |

SYSTEM FOR CONTROLLER MAINTAINS TABLE SHOWING ACTUATORS AND SENSORS AND ACCORDINGLY ASSIGNING ADDRESSES AND ADDS TO TABLE IF ACTUATORS AND SENSORS WERE ADDED DURING SAME TIME

The invention relates to the remote controlling of electrical installations within a limited area, for example within a home, office or factory environment.

Electrical installations may be controlled by a central controller provided that some means for transmitting signals between the controller and the other electrical installations is provided, and that each electrical installation contains means for decoding the signal and acting upon the information contained therein.

Taking a typical domestic system, namely a heating system, a controller transmits signals to heating installations by superimposing electrical signals of a relatively high frequency onto the mains supply voltage distributed over a power supply network. These electrical signals do not travel far, due to the inherent losses in mains transmission lines at such high frequencies. Alternatively, signals may be transmitted between the controller and the other installations by infra-red links, radio transmission, or dedicated low loss cables such as twisted pairs or coaxial cables connecting the controller and the installations together.

Each installation is assigned a particular address, which is unique to that installation. The transmitted signals must contain the particular address of an installation, a code for which type of equipment the signal is addressed (for example, heating), and the action required from that equipment (for example, "heat").

The controller contains a set of instructions for each type of installation, which may be split into simple 'ON'-'OFF' type commands before transmission to individual installations, or more sophisticated installations may decode and act on full instructions e.g. "heat to 30° C.".

Figure 1:
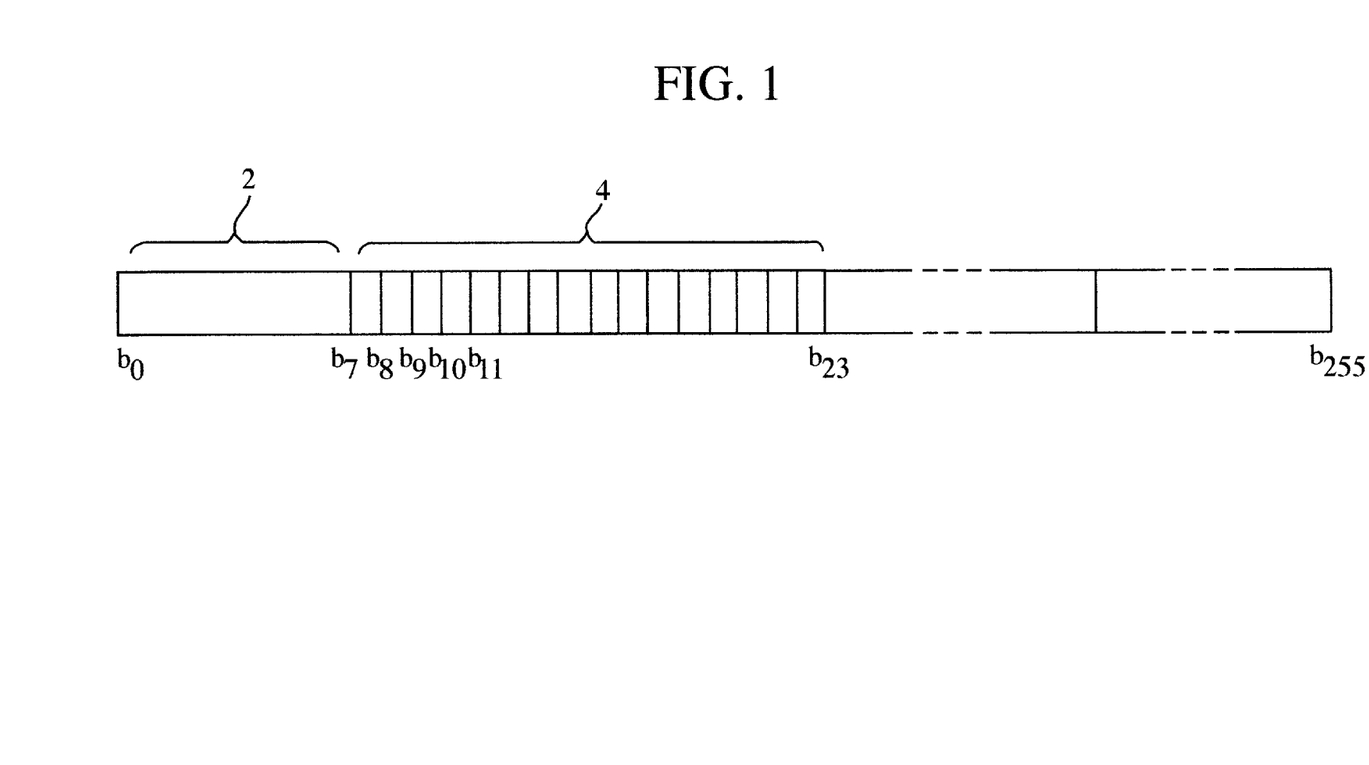
FIG. 1, as already depicted, represents a frame of data used in control systems of the prior art.

FIG. 1 shows the format of a typical signal used for such control of electrical installations. A first set 2 of eight bits $b_0$–$b_7$ contains fixed information, which may be a reference code of the manufacturer of the installation which transmits the signal; a series 4 of 16 bits $b_8$–$b_{23}$ allows the indication of the type of installation which is being addressed; the remaining bits $b_{24}$–$b_{255}$ are available for the transmission of the particular address of a destination installation and the instructions to this destination installation.

The series 4 of 16 bits $b_8$–$b_{23}$ is typically used as follows: all bits are in one state (0) except for one bit which indicates the type of installation being addressed. Bit $b_8$=1 may indicate a heating installation, bit $b_9$=1 for a lighting apparatus, bit $b_{10}$=1 for a cooking installation, bit $b_{11}$=1 for an entertainment system, and so on.

A sensor may be included in the system for providing a feedback on the operation of the installations; for example the ambient temperature of an area which is being heated by a controlled heater. Bit $b_{23}$ is set to 1 to indicate that the frame was transmitted by a sensor, in addition to bit $b_8$, which is set to 1 to indicate that heating is involved. Normally, only one sensor is used per type of installation.

Such a sensor may be located in a remote position, without a convenient mains electrical supply. A battery powered sensor may then be used, with a built in radio, infra-red or other transmitter sending data frames to a receiver built into the controller. Alternatively, a special cable may be installed, connecting the sensor to the controller or to any other installation. This may serve both as a signal transmission medium and a power supply connection.

Normally, the controller assigns a unique particular address to every installation under its control, plus an address for the controller itself. When a new installation is to be added to the system, the installation is installed, and sends a handshake message to the controller. This handshake message generally contains a manufacturer's reference code in bits $b_0$–$b_7$, 2, plus the type indication bits, $b_8$–$b_{23}$, 4. The controller assigns a particular address to the new installation, and brings it under control. A controller can be configured to control only one type of installation, several types, or all types.

Figure 2:
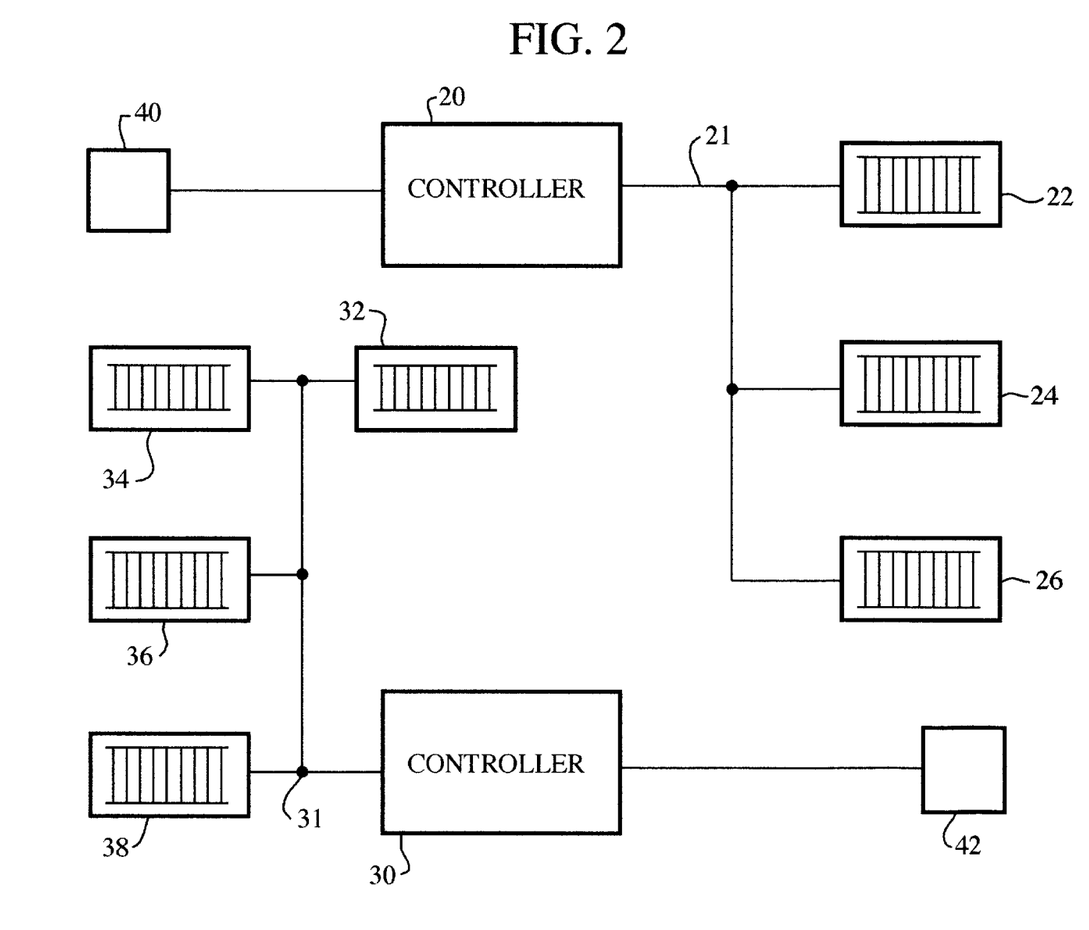
FIG. 2, as already depicted, represents controlled systems of the prior art.

FIG. 2 represents two simple systems where a first controller 20 is connected via a data path 21 to a first group of heaters 22, 24, 26. A second controller 30 is connected via a data path 31 to a second group of heaters 32, 34, 36, 38. The controller 20 is being used to control the first group of heaters 22, 24, 26 to heat a first area, and a second controller 30 is being used to control a second set of heaters 32, 34, 36, 38 to heat a second area. The first controller 20 receives information from an associated sensor, 40. The second controller 30 receives information from an associated sensor 42.

According to this information and the instructions stored in an instruction memory in each controller, the first controller 20 sends instructions to the heaters 22, 24, 26 to heat the first area or to allow it to cool. The decisions are based on the data from a single sensor 40. Any difference between the ambient temperature in parts of the first area cannot be taken into consideration by the controller.

Control is effected by the controller 20 emitting commands or instructions with the format shown in FIG. 1, with bit $b_8$=1 to indicate heating, and the particular address of each heating installation in the message. The heating installation responds by echoing the command or the instruction and emitting the particular address of the controller.

This may be repeated for each installation separately, or a special code (e.g. particular address '11111') may be used to address all installations of the same type.

However, if a second group of heating installations 32, 34, 36, 38 is required to be controlled independently of the first group, including its own associated sensor 42 for feedback, and with its own set of instructions or commands, a second controller 30 with an instruction memory must be used to operate them. This may be the case, for example, for different floors of a tower block or different areas of a factory. In this way, the second group of heaters 34, 36, 38 and the sensor 42 operate entirely independently, and in the same way as the first group, as described above.

The controllers 20, 30 each receive information from the respective associated sensor 40, 42 as to the temperature of the area heated by each system. The controllers 20, 30 control each of the heaters accordingly. In this implementation, two independent controllers independently control two groups of the same type of installation.

Each controller may control one or several types of installation, but the installations of one type are all subjected to commands derived from the same set of instructions, according to feedback information from a single sensor. In order to have independent control of two or more groups of installations of the same type, a plurality of controllers 20, 30 are required.

This type of system has several inconvenient features, and among them are: the fact that only one sensor can be used to provide feedback on the operation of all of the heaters of the system; timing and temperature setting of the heaters is carried out globally, such that all heaters connected to a same controller are turned on and off at the same time, and all receive commands derived from the same set of instructions; fluctuations between different areas, for example different parts of the heated area, cannot be accounted for within a single controller; if independent control of two or more groups of installations of the same type is required, two or more separate systems need to be used, with separate controllers and the attendant inconveniences of inflexibility of the system, installation time and cost, and the cost of several controllers duplicating many common functions.

The invention aims to resolve the problems of the prior art by providing a control method which allows installations of each type to be divided up into a number of groups, each of these groups being controlled independently of the state of all other groups and types of installation present, and all groups being controlled by a single controller. Multiple feedback sensors may be provided, at least one for each group of installations, to allow independent control and feedback of each group of installations, and to allow variations in temperature within the area heated to be taken into consideration.

As a summary, the invention provides a single controller which stores a list of liaisons between groups and particular addresses of individual installations in a non-volatile memory. Contained in the memory of the controller are a number of sets of instructions, one for each group of installations of each type. These instructions give rise to commands which will only be sent to installations of the relevant group, and all sets of instructions may be completely independent of each other. The set of instructions for each group are each identified using a group identifier code.

By taking the particular address of a certain individual installation and finding the corresponding group identifier code, the relevant set of instructions may be found in the memory and the commands sent to the individual installation according to the set of instructions for its group.

The list of liaisons may be wholly stored in a liaison memory in the controller, or may be partly or wholly stored in memory in the installations.

Assigning of a certain installation to a particular group takes place in the liaison memory. It may be done either from the installation, using a built-in keypad; a temporarily connectable keyboard; radio or infrared remote controllers, or preferably, the controller may be configured to accept all new installations into a particular group, before the installation is installed. The assignments may later be changed at the controller or at the installation to be changed.

The invention concerns a method for controlling a plurality of electrical installations of one or more types connected to a common data path. Each installation includes means for decoding a signal transmitted over this common data path to it by a single controller. The method includes the steps of:

transmitting, from each controlled installation to the single controller, an identification data frame, containing an installation type identifier code, receiving of the identification data frame by the controller, decoding of the identification data frame by the controller, controlling of each installation by the single controller according to a set of instructions held in an instruction memory of the single controller and corresponding to the type of installation identified by the installation type identification code, and, according to the invention, further comprises the steps of:

organising electrical installations of a same type into groups, transmitting a group identifier code within a frame of data in either direction between each installation and the single controller, decoding of the received group identifier code by the single controller, controlling of each installation by the single controller according to a subset of instructions corresponding to the group of installations within the type of installation, stored within the instruction memory of the single controller.

A particular aspect of the invention includes the steps of:

assigning a particular address to an installation, by the single controller, registering, in a liaison memory, a liaison between the particular address of the installation and a group identifier code corresponding to the group containing the installation.

Another aspect of the invention includes the steps of:

transmitting, from each installation to the single controller, the group identifier code only at the time of installation, assigning a particular address to the installation by the single controller, registering in a liaison memory, the liaison between the particular address of the installation and a group identification code.

Furthermore, the method may include communication with one or more feedback sensors, which involves the steps of:

controlling of a sensor by the single controller, assigning this sensor to a group of installations, modifying the instructions of a group of installations corresponding to the sensor according to information contained in a frame of data transmitted by the sensor to the single controller.

Any of these aspects may further include recording, within the controller, the liaison between a newly installed installation and a group identifier, transmitted either by the single controller to the newly installed installation, or by the newly installed installation itself, at the time of installation.

The frames of data may be transmitted by means of an electrical signal superimposed on an electrical supply voltage, with a frequency higher than that of the electrical supply voltage, or by radio transmission, a combination of these two, or any other suitable means.

Certain particular aspects of the invention will be described below, wherein:

FIGS. 4A to 6 represent data frames transmitted by various installations of the controlled system of the invention;

Figure 3:
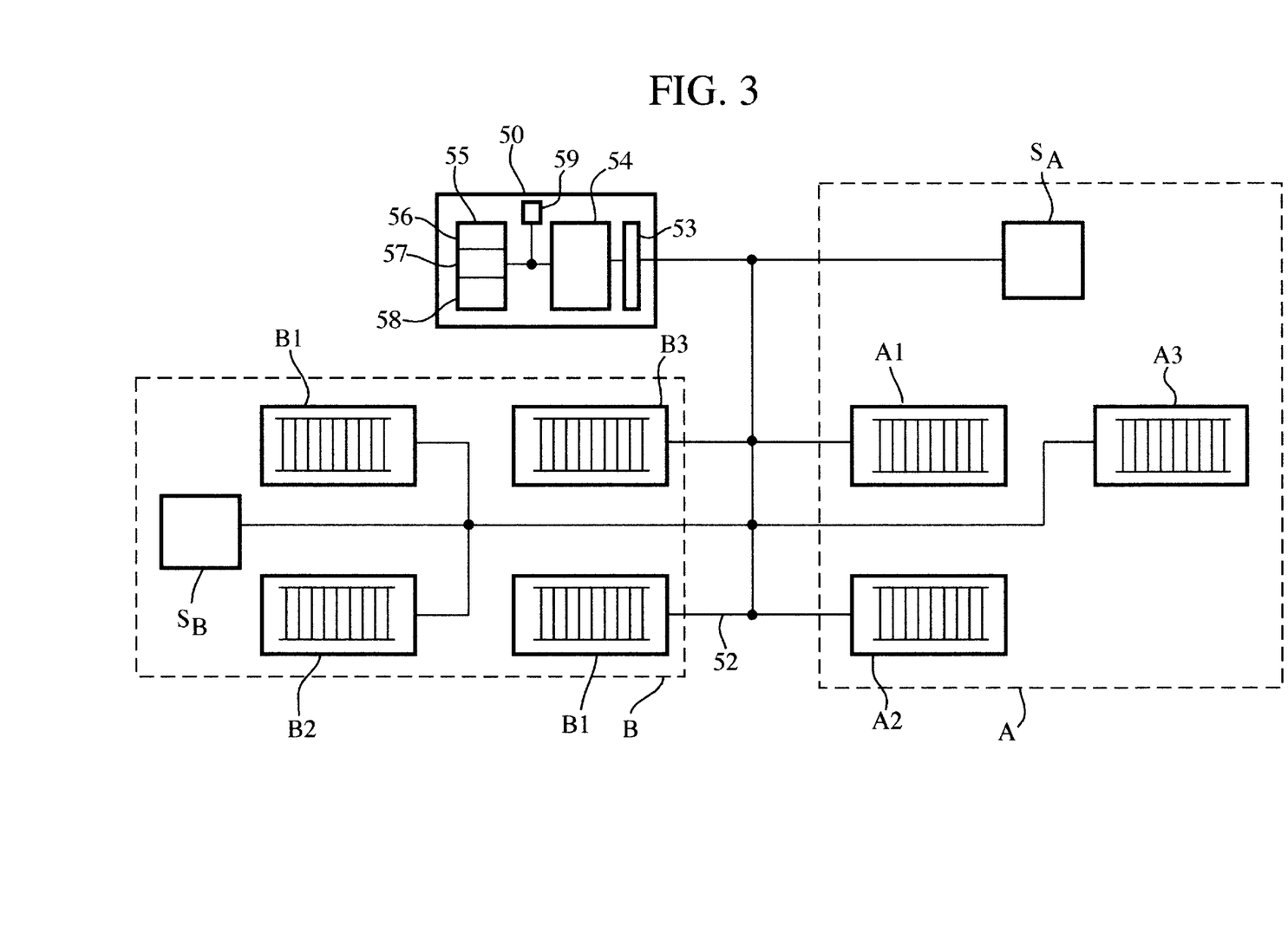
FIG. 3 represents a controlled system of electrical installations according to the current invention.

With reference to FIG. 3, the invention provides for a single controller 50 to independently control several groups A, B of installations of the same type, in this case heaters. The first group, group A, contains heaters A1, A2, A3, and a sensor, $S_A$. Group B contains four heaters B1, B2, B3, B4, and a sensor $S_B$. More than two groups could have been defined. A common data path 52 links all the installations of the system together. Typically, this is the electrical mains supply network. Each of the sensors $S_A$, $S_B$ monitors the temperature in the area heated by the respective group of heaters. The controller 50 controls each group A, B of heaters independently of the control being exercised over the other group.

The controller 50 comprises, classically, a receiving circuit 53 connected to the data path 52 to receive and transmit data from or to the installations. It further comprises a logic circuit 54 for processing data according to instructions memorised in a non-volatile instruction memory 55. The logic circuit 54 or the receiving circuit 53 are able to decode the data. It depends on a chosen implementation. The logic circuit 54 may typically include a microcontroller or a microprocessor.

In accordance with the invention, the instruction memory 55 comprises zones 56, 57, 58 for storing different sets of instructions for different groups of installations of a same type. The controller 50 also comprises a non-volatile liaison memory 59 for storing liaisons between groups and installations, and groups and instruction memory zones 56, 57, 58.

Several methods of assigning particular addresses and groups to installations are possible. Among them are:

(i) When a new installation is to be installed, the controller is instructed that all new installations are to be placed in a particular group, for example group A. As the new installation is installed, it sends its identification frame to the controller. The controller responds with a frame containing the identifier for group A, a particular address, and a command to the new installation that this is its allocated particular address. The installation memorises its own group identifier and particular address.

(ii) When a new installation is to be installed, the controller is instructed that all new pieces of equipment are to be placed in a particular group, for example group A. As the new equipment is installed, it sends its identification frame to the controller. The controller responds with a frame containing a particular address, and a command to the new installation that this is its allocated particular address. The installation memorises its particular address. The liaison between the particular address and the group is stored only in the controller's memory.

(iii) When a new installation is installed, the group is allocated at the new installation, either by the use of a built in keypad or a temporarily connectable keyboard. Also, buttons on the controller may be used to notify the new installation of its allocated group. The new installation includes the relevant group identifier code in its handshake message. The controller notes the assigned group, allocates a particular address and stores the liaison in its memory. The controller transmits to the installation a frame containing the group identifier and the allocated particular address and a command to the installation that the transmitted address has been allocated. The installation memorises this address.

(iv) A newly installed installation transmits its identification frame to the controller. The controller responds with an allocated particular address and a command to store this address. The group allocation is made at the installation, which does not transmit this information to the controller. The liaison between the address and the group is stored only in memory within the installation.

The information required to be contained in data frames exchanged between the controller and the controlled installations will depend on which of the above methods are used.

To enable such systems to operate, changes must be made to the definition of the data frames transmitted between the controller and the controlled installations.

FIGS. 4A to 6 show data frames which could be used according to the first described method of address and group allocation, whereby both the particular address and the group identifier are included in every frame.

Figure 4A:
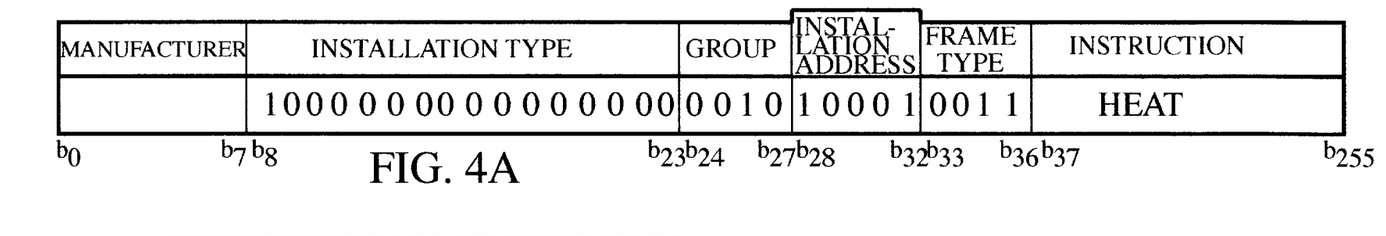

FIG. 4A shows a data frame transmitted by the controller to a heating installation of group A. Bits $b_0$ to $b_{23}$, 2, 4 are used as previously described; they contain the manufacturer's code in bits $b_0$–$b_7$ 'Fabricant', the installation type in bits $b_8$–$b_{23}$ 'Type d'installation'. Bits $b_{24}$–$b_{27}$ are used to transmit a group identifier 'Groupe' of the group to be controlled. In the figure, the identifier 0010 is being used to indicate group A. Using such a four bit group identifier, it is possible to define sixteen groups of installations of the same type. Bits $b_{28}$–$b_{32}$ contain the particular address 'Adresse Indiv. Dest.' of the installation being addressed, in this case 10001, or a special address, for example 11111, may be used to indicate all members of the specified group. Bit $b_8$ may be set to 1 to indicate that a group of heating appliances is being addressed. Bits $b_{33}$–$b_{36}$ contain a four bit code indicating a frame type. In this case, the four bit code is 0011, and indicates a command frame. Specific commands or instructions are encoded into bits $b_{37}$ to $b_{255}$, in this case, the instruction "heat".

Figure 4B:
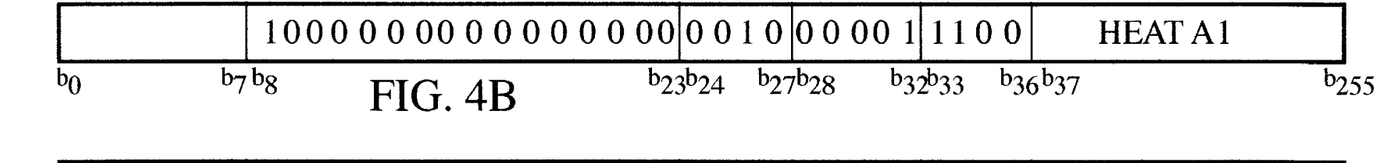

FIG. 4B shows a typical response data frame from a heater of the addressed group. As before, bit $b_8$ may be set to 1 to indicate that a heating installation is concerned; bits $b_{24}$ to $b_{27}$ contain the identifier of group A, bits $b_{28}$ to $b_{32}$ contain the destination address, in this case, the controller's address 00001, and bits $b_{33}$ to $b_{36}$ contain a code indicating that the command has been received (an acknowledge frame type, with the four bit code 1100) and repeats, in bits $b_{37}$ to $b_{255}$, the command for error checking by the controller, e.g. "heat". Also included in the response frame is the emitting installation's particular address 'A1'. Both the emitting and destination addresses are necessary for the unambiguous interpretation of the message.

Figure 5A:
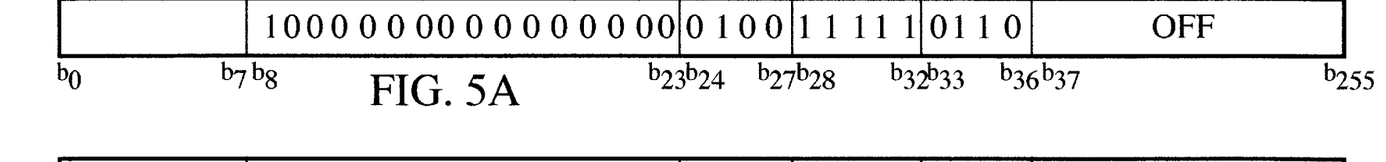

FIG. 5A shows a data frame called a broadcast command, transmitted to turn off all the heaters of group B. In this case, bit $b_8$ may again be set to 1 to indicate that heating installations are concerned, but the bits $b_{24}$ to $b_{27}$ now contain the identifier for group B, '0100'. The address '11111' in the address bits $b_{28}$ to $b_{32}$ signifies "to all members of the group". Bits $b_{33}$ to $b_{36}$ contain the frame type code 0110 to indicate a broadcast command. The command in bits $b_{37}$ to $b_{255}$ is simply "OFF".

Figure 5B:
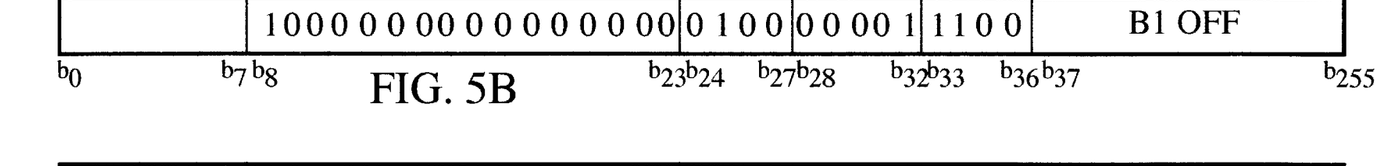

FIG. 5B shows the data frame transmitted to the controller by one of the heaters of group B upon reception of the instruction frame shown in FIG. 5A. The heating type identifier $b_8$ and the group address $b_{24}$ to $b_{27}$ identify the message as originating from a heater of group B; bits $b_{28}$ to $b_{32}$ contain the destination address, in this case the controller; bits $b_{33}$ to $b_{36}$ contain the code 1100 to indicate, as in FIG. 4B, that a command has been received; bits $b_{37}$ to $b_{255}$ contain a repeat of the command or instruction for error checking, and the particular address of the emitting installation, in this case B1.

Figure 6:
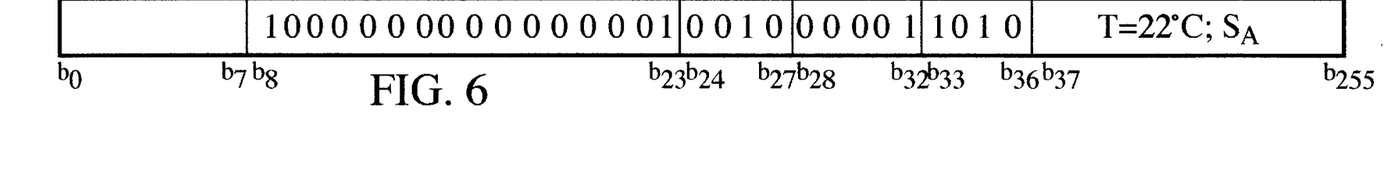

FIG. 6 shows a data frame transmitted by sensor $S_A$ which detects the ambient temperature in the area heated by the heating installations of group A. The sensor may either send such data at predetermined intervals—for example, once per minute, or when requested to do so by the controller or according to the value of the measured criterion. Bit $b_{23}$ is set to 1 to indicate that the data frame originates from a sensor; bit $b_8$ is set to 1 to indicate that the sensor is monitoring heating installations; the bits $b_{24}$ to $b_{27}$ contain the group identifier for group A—'0010'; bits $b_{28}$ to $b_{32}$ indicate the destination address '00001'. Bits $b_{33}$–$b_{36}$ contain the frame type code, 1010 indicating a sensor output frame. The final bits, bits $b_{37}$ to $b_{255}$, include data, and the address of the emitting installation, in this case "sensor $S_A$; temperature=22° C.". A response may be sent from the controller to the sensor to confirm that the data has been correctly received. Furthermore, the sensor may transmit supplementary commands, for example if the measured temperature exceeds a predetermined limit level, e.g. 50° C., the sensor may request the controller to shut down all of the heaters.

Using the information supplied by the sensor, the controller may decide to change its commands to the group monitored by the sensor, completely independently of the commands given to members of other groups.

A set of more than one sensor per group may be used. In such a case, liaisons between the set of sensors and the heaters depending on those sensors must also be stored in the controller's liaison memory 59. Individual heaters can be controlled according to the feedback from closest sensors, or a mean value of the set of sensors.

This method of controlling different types of electrical installations, each divided into a number of groups, may be conveniently represented in memory by an addressing map.

Figure 7:
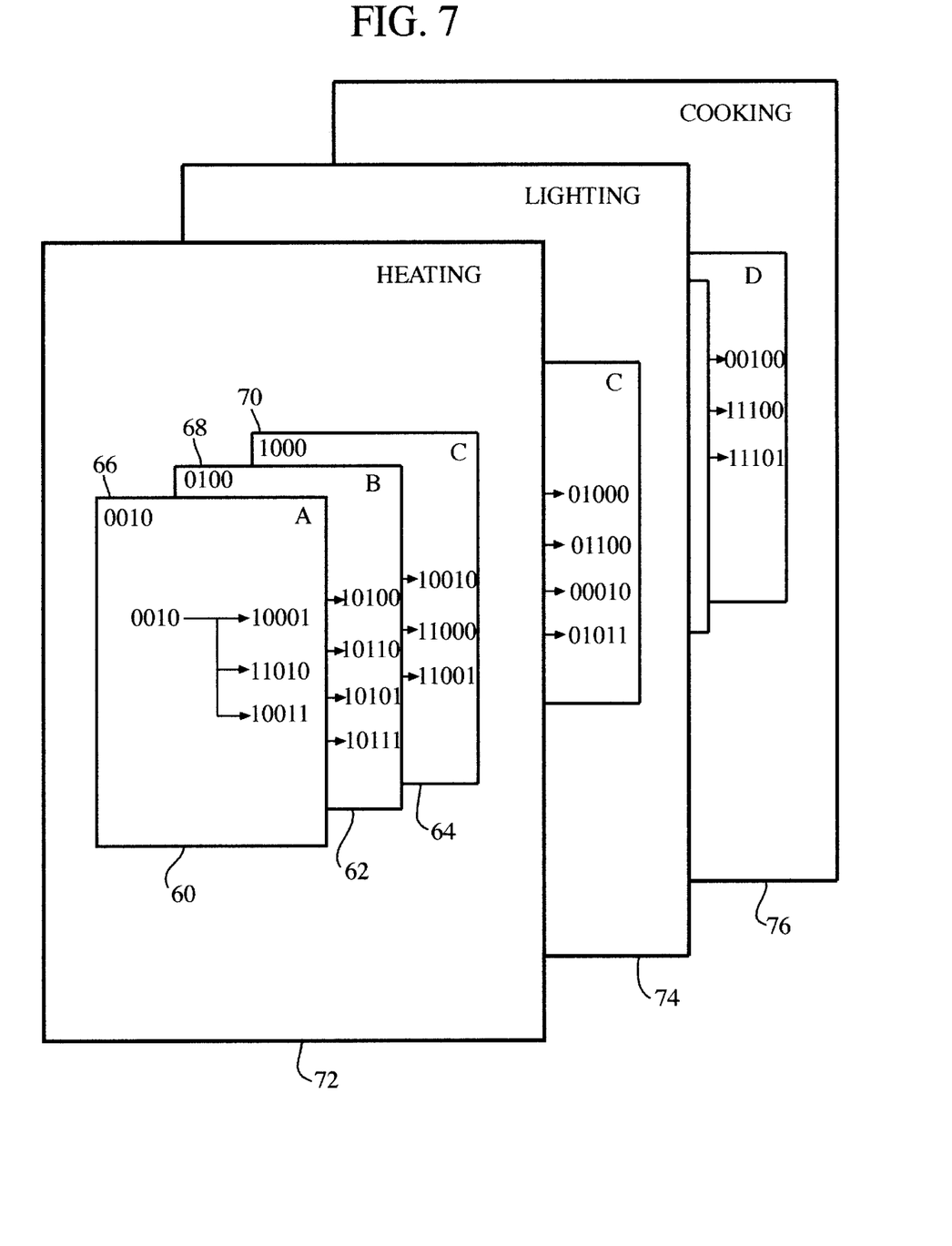
FIG. 7 represents a memory map for use in controlling a system of electric installations according to the invention.

FIG. 7 shows a typical address map, serving as a liaison memory 59 within the controller 50 in FIG. 3. In this case, up to four groups A, B, C, D of each of several types of installation have been defined. Each type of installation heating, lighting, cooking has a set of pages 72, 74, 76 associated with it. Taking the heating type 72 as an example, each group A, B, C, has a page 60, 62, 64 in memory which is allocated a page address 66, 68, 70 which may also be the respective group identifier. Within each page, the controller memorises the particular address of each of the installations belonging to that group. The page 60 includes the addresses of installation A1, 10001; A2, 11010; A3, 10011 whereas page 62 includes the addresses of the installations of group B, being B1, 10100; B2, 10110; B3, 10101; B4, 10111 and similarly, page 64 contains the addresses of the installations of group C: C1, 10010; C2, 11000; C3, 11001. This mapping system can be used such that whenever an instruction destined for a group needs to be sent, the controller can break this down into a set of instructions, each to be sent to one particular member of the group.

Group instructions may therefore be transmitted individually so that information from two or more sensors in a same group can be used to cause cooler areas to be heated more than warmer areas, within the same group. It is entirely possible that a sensor near to a window measures 20° C. while another sensor near to electrical equipment measures 27° C. Individual heaters may then be controlled to even out the temperature throughout the area heated by a certain group in accordance with an instruction "heat to 30° C.".

Another set of pages 74 located elsewhere in the liaison memory contains pages representing, in an identical manner, groups of lighting installations, and another set of pages 76 contains pages representing groups of kitchen equipment. This allows the controller to address the different types and groups of installations individually and independently.

In practice, the memory map of FIG. 7 may be arranged in a memory area by using the addresses of memory locations to define pages.

Figure 8:
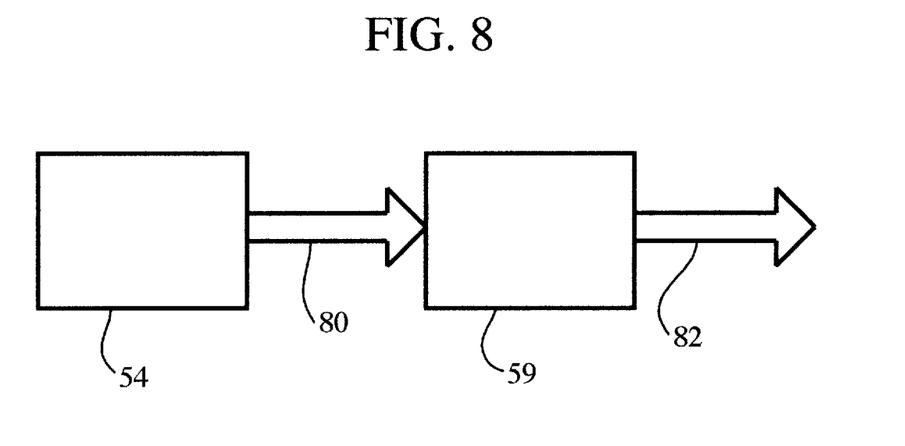
FIGS. 8 and 9 represent a memory addressing scheme according to the memory map of FIG. 7.

Referring to FIG. 8, such an arrangement may be made by supplying memory addresses from the logic circuit 54 to the liaison memory 59 via an address bus 80. These addresses cause locations within the liaison memory 59 to be accessed and their contents to appear on the output data bus 82. These contents may be the particular addresses of installations. The addresses on the address bus 80 may be such that the particular addresses of several or all members of a particular group of a particular type of installation are sequentially applied to the output bus 82.

Figure 9:
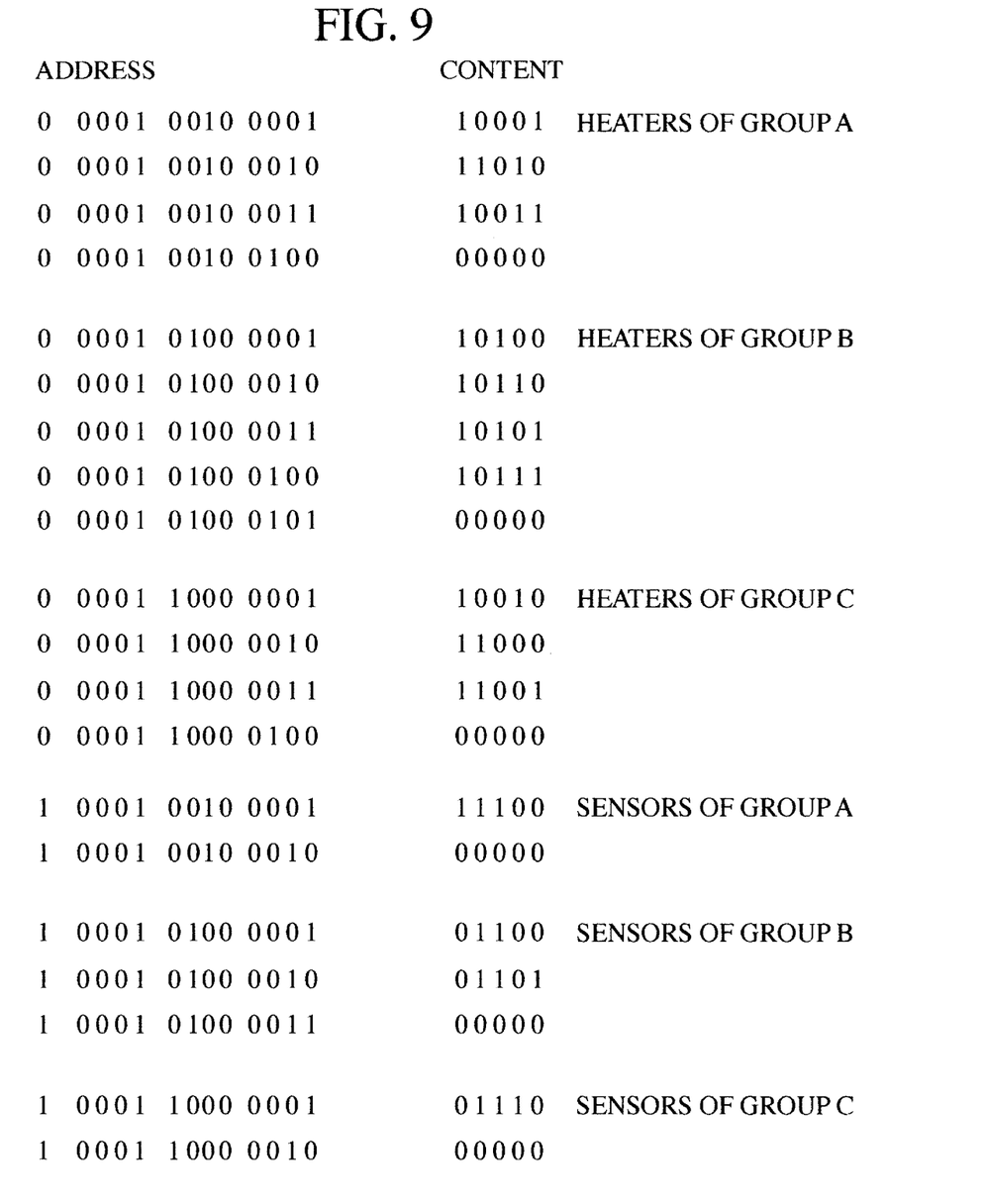

FIG. 9 shows such a method of organising the liaison memory to include the set of heating pages described above. The left hand column lists thirteen bit addresses of words in the memory, and the right hand side column contains the contents of each of these words in memory. The contents of each of these words is the particular address of one installation of the system. By applying an address, given in the left hand column to the address bus 80 of FIG. 8, the corresponding contents—a particular address of an installation—will be provided on the output bus 82.

The first bit of each memory word address is the sensor type bit $b_{23}$, the next four bits of the memory word address are a binary interpretation of bits $b_8$ to $b_{22}$, giving the type of installation. (Only one of these fifteen bits is ever active at any one time. The four address bits contain the value of x where, to represent bit $b_n$, x=n−7. Bit $b_8$=1 is therefore represented by x=1, '0001', and so on until bit $b_{22}$=1 is represented by x=15, '1111'.) The next four bits are the group identifier, and the final four bits of the address increment for each group in each type. Any memory word which does not contain a particular address of an installation contains '0000'. The contents of the memory words identified by an installation type and a group identifier code are the particular addresses of the installations in that group.

For example, to address all the heaters of group A, the controller first places the address 0 0001 0010 0001 on the address bus 80, and the particular address of the first member of the group will appear in the data bus 82. The controller increments the address applied to the address bus 80 to 0 0001 0010 0010 to obtain the particular address of the next member of group A. This continues until a particular address of 00000 is returned, indicating no further installations assigned to that group.

A memory map for lighting installations would have the first five bits of the memory word address '0 0010' for the lighting installations themselves, plus '1 0010' for feedback sensors, which could be broken bulb detectors.

Using this memory organisation, the possibility of defining up to 16 groups is preserved, and the possibility of installing several sensors per group is included. The number of possible installations per group is limited by the address length. In this example, with 4 bits, 16 installations per group may be made. With an extra available addressing bit, up to 32 installations per group are possible.

Other methods for organising the memory are possible, such as addressing the memory using annexed addressing, that is taking a fixed start address and adding some or all of the contents of a data frame to address the required memory location, which will contain the relevant installation's particular address.

The advantages of the current invention will be more clearly appreciated with reference to the following examples.

Suppose that a heating system is to be configured in a tower block, with the installations on each floor belonging to different groups.

The electrical supply lines may preferably be used for the transmission of data, as no additional wiring installation is required. A single controller is placed in a maintenance room within the building. Before installation of heaters on, say, the 6th floor, the controller is manually instructed, for example by using a built-in keypad, that all heaters newly installed will be in group A. As the heaters are installed, each one sends its identification frame, as previously described, to the controller. Identification frames may be identified by using a particular code in bits $b_{33}$–$b_{36}$, the frame type code bits. The installation of one or more sensors proceeds similarly. Upon reception of each identification frame, the controller assigns an address to the installation which emitted the identification frame using a special command and frame type code in bits $b_{33}$ to $b_{255}$ of a frame, and the liaison between the address given and group A is stored within the memory of the controller, again using an appropriate frame type code. Any of the required instructions may be transmitted to the controller by any suitable remote control device, for example, an infra red or radio transmitter.

When all the heaters on the 6th floor have been installed, the controller is similarly instructed that all following new installations are to be placed in group B. Installation of the next group of heaters, say the 7th floor, may now begin. Installation, address allocation and storage of the liaison between the addresses and the groups are performed in the manner described above. Similar procedures may be followed for further floors and groups.

The controller is then programmed with a set of instructions to be executed for each group of installations.

Commands derived from these instructions are transmitted to each member of the relevant group using the pages in memory to identify the particular addresses of the members of the group, as described earlier. The commands for group A are then transmitted individually to installation addresses 10001, 11010, 10011. The feedback signal from a sensor may contain either the sensor's particular address and group identifier, or the group identifier only if only one sensor per group is used. Use of the particular address is necessary if more than one sensor per group is used.

With this method, it is not necessary to transmit the group identifier between the controller and the installations. Individual installations may be changed from one group to another at the controller, without having to visit the installation itself. This is useful, in applications such as blocks of flats with communal heating systems, where access to individual heaters would be difficult.

Such a system allows for up to 16 groups of each type of installation (using a four bit group identifier), and a total of up to 30 installations of each type, using a five bit address (addresses 00000 and 11111 being used for other functions, as previously described). Longer addresses could be used to control a greater number of installations.

Alternatively, the controller may inform each new installation of both its particular address and group identifier. These are then stored in both the controller and the controlled installation. While this reduces the flexibility of the system, it allows each of up to sixteen groups of each type of installation to contain up to 30 members. Appropriate frame type codes will be included in each frame to allow each frame to be correctly interpreted.

An alternative method involves assigning a group at each installation by means of a temporarily connectable keyboard, or a keypad built in to the installation, in conjunction with a small controller and a program stored in a memory within the installation. The keypad or temporarily connectable keyboard may be replaced by any suitable remote control device, using for example infra red or radio waves to transmit information to the installation.

In this case, there is no need to visit the controller. Once the newly installed installation has been assigned to a group, it sends its handshake signal to the controller, including the four bit group identifier. The controller then assigns it an individual address.

The controller stores the liaison between the individual address and the group in its memory.

Either whole groups or individual installations may be addressed by transmitting an instruction including the group identifier and either the particular address of the installation or the code indicating that all installations of the group should obey the instruction, in addition to the appropriate frame type code, as described earlier.

For the purpose of assigning particular addresses, the sensors may transmit data frames containing their group identifier only, or their group identifier plus their individual address, or even their individual address only, depending on the memory arrangements and the address allocation method used.

This aspect of the invention also allows for up to 16 groups for each device type, and up to 30 installations in each of these groups. Group allocation may be selected and changed at the installation, allowing for example, residents of a tower block the choice of up to 16 heating programs.

A third method of installation involves allocating a group at each installation and holding the liaison between the group and the individual address within each installation. The allocation may be done using a built-in keypad, a temporarily connectable keyboard or a remote control device using a suitable transmission medium, such as infra red or radio waves. The controller may systematically transmit a 'prompt' signal to a particular address, to which the addressed installation replies with its group, and the controller then transmits the relevant instructions. This method also limits the total number of installations of any one type to 30. It also allows the assignment of a particular installation to be changed without visiting the controller. It is similarly useful in situations where the user is permitted to change group assignment, as in the previous example. Again, appropriate frame type codes should be used to allow unambiguous interpretation of each frame.

According to any of the aspects of the invention described, each type of installation may be split into a number of groups, each subjected to a set of instructions stored in the controller's memory, such instructions being independent for each group of installations, and each type of installation.

This allows control to be effected from a central controller according to different requirements of different groups of installations.

The discussion has been limited to heating applications, by way of example, but the same method is applicable to, and may be controlled by a common controller with, other home automation applications such as lighting of different floors or areas of a building, in addition to building management functions on a larger scale, such as cooking for large scale production of foods requiring different conditions, even light industrial machinery which includes suitable decoding and interface circuitry.

Different memory addressing techniques, and different methods of assigning particular addresses, and different lengths of particular addresses may be used to increase either or both the number of groups which may be defined for each type of installation and the total number of installations possible.

A significant saving in installation cost is made over the prior art, in addition to the ease of control from a central controller, and a greater flexibility in the control which may be exercised over individual installations is provided.

Although the invention has been described with reference to specific embodiments, numerous variants and embodiments of the invention will be apparent to those skilled in the art. In particular, a controller as described may be used to control any apparatus, not necessarily domestic or light industrial applications; the data transfer between controller and controlled installations may take place over any medium; groups of installations do not necessarily have to contain more than one member.

I claim:

1. A method for controlling a plurality of electrical installations of one or more types connected to a common data path, each including means for decoding a signal transmitted over this common data path to it by a single controller, comprising the steps of:

transmitting, from each controlled installation to the single controller, an identification data frame, containing an installation type identifier code, receiving of the identification data frame by the controller, decoding of the identification data frame by the controller, controlling of the installation by the single controller according to a set of instructions held in an instruction memory of the single controller and corresponding to the type of installation identified by the installation type identification code, organizing electrical installations of a same type into groups, transmitting a group identifier code within a frame of data in either direction between each installation and the single controller, decoding of said group identifier code by the single controller, controlling of the installation by the single controller according to a subset of instructions corresponding to the group of installations within the type of installation, stored within the instruction memory of the single controller, wherein said controller assigns a same group identifier code to all installations which are added within a specified time frame.

2. A method according to claim 1, further comprising the steps of:

assigning a particular address to an installation, by the single controller, registering, in a liaison memory, a liaison between the particular address of the installation and said group identifier code corresponding to the group containing the installation.

3. A method according to claim 1, comprising the steps of:

determining said group identifier code only at the time of installation, assigning a particular address to the installation by the single controller, registering in a liaison memory, the liaison between the particular address of the installation and said group identification code.

4. A method according to claim 1, comprising the steps of:

controlling of a sensor by the single controller, assigning this sensor to a group of installations, modifying the instructions of a group of installations corresponding to the sensor according to information contained in a frame of data transmitted by the sensor to the single controller.

5. A method according to claim 1 wherein each of the frames of data contains a frame type identifier code.

6. A method according to claim 1, comprising the step of: recording, within the single controller, the liaison between a newly installed installation and a group identifier, transmitted by the newly installed installation at the time of installation.

7. A method according to claim 1, comprising the step of: recording, within the controller, the liaison between a newly installed piece of equipment and a group identifier, transmitted to the newly installed installation by the single controller at the time of installation.

8. A method according to claim 1, wherein:

frames of data are transmitted by means of an electrical signal superimposed on an electrical supply voltage, with a frequency higher than that of the electrical supply voltage.

9. A method according to claim 1, wherein frames of data are sent to the single controller by radio transmission.

10. A method according to claim 1, wherein frames of data are sent to the single controller by infra red transmission.

11. A domotic control system, comprising:

a communication channel;

a controller which includes a microprocessor, and is coupled to said communication channel to send and receive data thereon;

a plurality of actuators, coupled to said communication channel to receive data thereon;

a plurality of sensors, coupled to said communication channel to send data thereon;

wherein said controller maintains a table showing physical correspondence between ones of said sensors and ones of said actuators, and accordingly assigns addresses to ones of said sensors and actuators;

wherein said controller adds, to said table, an indication of physical correspondence between ones of said actuators and ones of said sensors which are added during a same time period.

12. The system of claim 11, wherein said indication of physical correspondence comprises a group number which is shared by all ones of said actuators and said sensors installed in a given space.

13. The system of claim 11, wherein said actuators comprise on/off switches.

14. The system of claim 11, wherein said sensors sense a temperature value.

15. A domotic control method, comprising the steps of:

(a.) transmitting over a common data path, from ones of a plurality of electrical installations to a controller, an identification data frame containing an installation type identifier code;

(b.) decoding of the identification data frame by the controller, and controlling said installations by said controller according to a set of instructions held in an instruction memory of said controller and corresponding to the type of installation identified by the installation type identification code;

(c.) assigning a same group identifier code to each of said plurality of electrical installations which are installed within a same time period:

(d.) transmitting said group identifier code within a frame of data in either direction between each installation and the single controller; and (e.) controlling said installations by said controller according to a subset of instructions corresponding to the group of installations within the type of installation, stored within said instruction memory.

16. The method of claim 15, wherein a group identifier code corresponds to a room in which said electrical installations are placed.

17. The method of claim 15, wherein said electrical installations comprise temperature sensors and heaters.

18. The method of claim 15, wherein said group identifier code is assigned only at the time of installation of the corresponding electrical installations.

* * * * *